(No Model.)

J. J. NAYLON.
BRACKET.

No. 420,518.　　　　　　Patented Feb. 4, 1890.

Witnesses
W. Rossiter
Fredk. H. Mills

Inventor
John J. Naylon
By Chas. C. Tillman
Atty.

UNITED STATES PATENT OFFICE.

JOHN J. NAYLON, OF CHICAGO, ILLINOIS.

BRACKET.

SPECIFICATION forming part of Letters Patent No. 420,518, dated February 4, 1890.

Application filed August 5, 1889. Serial No. 319,805. (No model.)

*To all whom it may concern:*

Be it known that I, JOHN J. NAYLON, a subject of the Queen of Great Britain, residing at Chicago, in the county of Cook and State of Illinois, have invented certain new and useful Improvements in Brackets, of which the following is a specification.

My invention relates to improvements in brackets for displaying goods in show-windows and other places, and especially adapted for exhibiting shoes and foot-wear; and it consists in certain peculiarities of the construction of the different parts thereof and the novel arrangement of the same, as will be hereinafter more fully set forth and specifically claimed.

The objects of my invention are to afford an inexpensive bracket which shall be light, strong and durable, and attractive in appearance upon which the shoes can be easily placed and securely held, yet readily removed and adjusted to any desired position for best exhibiting the same.

In order to enable others skilled in the art to which my invention pertains to make and use the same, I will now proceed to describe it, referring to the accompanying drawings, in which—

Figure 1:
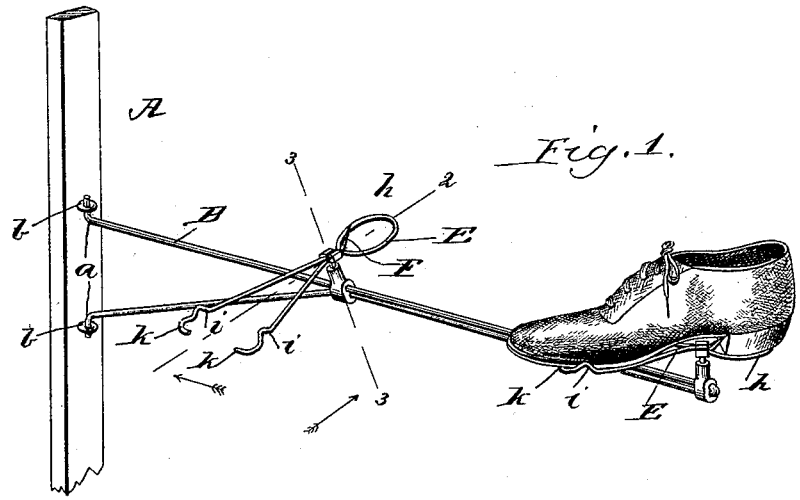
Figure 2:
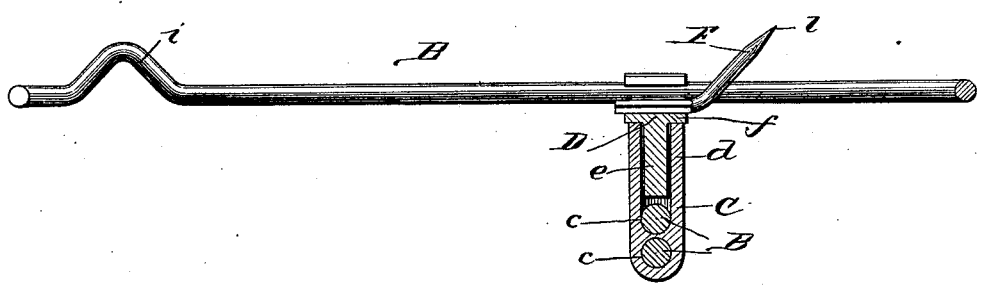
Figure 3:
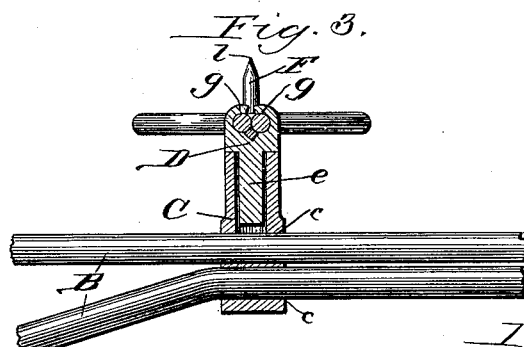

Figure 1 is a perspective view of my device secured to the window-casing, showing a shoe in place on one of the rests. Fig. 2 is a vertical cross-section taken on line 2 2 of Fig. 1, and Fig. 3 is a similar view at right angles to Fig. 2.

Similar letters refer to like parts throughout the different views of the drawings.

A represents the casing of a window or other supporting-surface to which is secured the supporting-arm B of my device. This arm is made of one piece of ordinary commercial wire of proper size and suitable length, and is bent at its free end, so that it will present two strands or rods close and parallel with each other to within a short distance of the ends to be secured to the wall, at which point the lower strand or rod is deflected, thus affording a brace or support, all of which will be readily understood by reference to Fig. 1 of the drawings. The ends of the arm to be secured to the wall are formed or bent, as at $a\ a$, to fit into suitable retaining devices $b\ b$, usually screw-eyes, which are screwed into the wall or casing.

C is a sleeve, made of suitable material, having at its lower portion two holes $c\ c$, passing through it horizontally, for the reception and retention of the rods of the arm B, as is seen in Fig. 2. The top of the sleeve C is formed with a socket $d$, preferably cylindrical in shape and of suitable size and depth. The holes $c\ c$ are sufficiently large to readily admit of the insertion of rods of the arms and to slide freely thereon to any desired point.

D is a pivot-piece or wrist, formed at its lower portion with a shank $e$, cylindrical in shape and of suitable size to fit snugly in the socket $d$ of the sleeve C. The top of the pivot is bifurcated and formed with shoulders $f$, which rest upon the top of the sleeve C. The flanges or forks $g$ are bent over and securely hold the shoe-rest E, as will be presently more fully explained.

The shoe-rest E is preferably made of one piece of wire and formed substantially as shown in Fig. 1—that is, the wire is bent to form the circular portion $h$, upon which the heel of the shoe rests. The strands of the wire are then bent nearly together and are firmly held in place on the pivot-piece by clinching the flanges $g\ g$ over them, as seen in Fig. 3. The ends are then sprung apart and formed at the proper distance with an upward bend $i\ i$ in each, and then deflected and bent laterally and inwardly, as at $k\ k$, forming a rest for the toe of the shoe, as will be readily understood.

F is a short piece of wire having one end inserted in and secured between and by the flanges $g$ on the wrist or pivot. The other end of this piece is pointed and forms a prong, as at $l$, and is bent upward at an angle, so as to extend slightly through and above the circular portion $h$, as is clearly seen in the drawings.

The operation of my device is simple and as follows: The arm B is bent back upon itself, as shown in Fig. 1, and the ends thereof are inserted into the holes of the sleeve or sleeves, which are slid on the arm to the desired point. The rest E and prong F, being securely held by the flanges of the pivot or wrist, are placed on the sleeve C and retained there by inserting the shank e, as is readily understood, in the socket d. The shank and socket, being cylindrical in form, permit the rest to be turned around easily. The shoe is then placed on the rest and is firmly held in place by the peculiar construction of the same. The bends $i\,i$, clasping the sides of the sole, prevent a lateral movement, and the bends $k\,k$ support the weight of the shoe and prevent downward displacement. The prong F, extending slightly up within the circular heel-rest, is designed to pierce the front portion of the heel and prevent a forward movement of the shoe.

In the drawings I have shown my bracket with two rests only; but of course I may use any number as readily. I have also shown in Fig. 1 one of the rests inclined forward at an angle, so that a different view of the shoe may be obtained. This is done by pressing the top of the sleeve in the direction desired, when the wire arm will yield sufficiently for this purpose. Of course I may use other rests of different construction to fit in the socket of the sleeve that may be adapted for displaying other classes of goods than shoes; but the form shown and described is my preferred construction.

Having thus fully described my invention, what I claim as new, and desire to secure by Letters Patent, is—

1. In a display-bracket, the combination of the supporting-arm B, bent back upon itself and having its ends formed with hooks $a\,a$, with one or more rests adjustably secured on the arm, and the securing devices $b\,b$, substantially as shown and described.

2. In a display-bracket, the combination of the supporting-arm B, bent back upon itself and having its ends formed with hooks $a\,a$, with the sleeve C, having holes $c\,c$ and socket $d$, secured on the arm, the rest E, adjustably secured in the socket, and the securing devices $b\,b$, substantially as shown and described.

3. In a display-bracket, the supporting-arm B, bent back upon itself and having its ends formed with hooks $a\,a$, in combination with the securing devices $b\,b$, the sleeve C, having holes $c\,c$ and socket $d$ and secured on the arm, the pivot D, having shoulders $f$, flanges $g\,g$, and rest E, adjustably secured in the socket, substantially as shown and described.

4. In a display-bracket, the combination of the supporting-arm B, bent back upon itself and having its ends formed with hooks $a\,a$, and the lower rod deflected, with the securing devices $b\,b$, the rest E, having at one end the circular bend $h$ and at and near the other end the upward bends $i\,i$ and lateral bends $k\,k$, the pivot D, having the flanges $g\,g$ and shoulders $f$, and the sleeve C, all constructed, arranged, and operating substantially as shown and described.

5. In a display-bracket, the combination of the supporting-arm B, bent back upon itself and having its ends formed with hooks $a\,a$, and the lower rod deflected, with the securing devices $b\,b$, the sleeve C, having holes $c\,c$ and socket $d$, adjustably secured on the arm, the pivot D, having shoulders $f$ and flanges $g\,g$, adjustably secured in the socket, the rest E, having at one end the circular bend $h$ and at and near the other end the upward bends $i\,i$ and lateral bends $k\,k$, and prong F, secured to the pivot, all constructed, arranged, and operating substantially as shown and described, and for the purpose set forth.

6. In a display-bracket, the supporting-arm B, bent back upon itself and having its ends formed with hooks $a\,a$, in combination with the securing devices $b\,b$ and the rest E, having at one end the circular bend $h$ and at and near the other end the upward bends $i\,i$ and lateral bends $k\,k$, and prong F, adjustably secured to the arm, substantially as shown and described.

In witness whereof I have hereunto set my hand and affixed my seal, at Chicago, Illinois, this 3d day of August, 1889.

JOHN J. NAYLON. [L. S.]

In presence of—
CHAS. C. TILLMAN,
D. A. RAY.